(12) United States Patent
Esseghir et al.

(10) Patent No.: US 10,712,522 B2
(45) Date of Patent: Jul. 14, 2020

(54) FLOODING COMPOSITIONS COMPRISING BIO-BASED FLUIDS

(71) Applicant: Dow Global Technologies LLC, Midland, MI (US)

(72) Inventors: Mohamed Esseghir, Collegeville, PA (US); Karl M. Seven, Collegeville, PA (US); Xiaodong Zhang, Collegeville, PA (US); Yi Jin, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/320,755

(22) PCT Filed: Jun. 15, 2017

(86) PCT No.: PCT/US2017/037616
§ 371 (c)(1),
(2) Date: Jan. 25, 2019

(87) PCT Pub. No.: WO2018/022210
PCT Pub. Date: Feb. 1, 2018

(65) Prior Publication Data
US 2019/0162925 A1 May 30, 2019

Related U.S. Application Data

(60) Provisional application No. 62/368,282, filed on Jul. 29, 2016.

(51) Int. Cl.
*G02B 6/44* (2006.01)
*H01B 3/44* (2006.01)
(Continued)

(52) U.S. Cl.
CPC ............ *G02B 6/4494* (2013.01); *C08L 91/00* (2013.01); *H01B 3/22* (2013.01); *H01B 3/441* (2013.01);
(Continued)

(58) Field of Classification Search
CPC ........ G02B 6/4494; H01B 7/285; H01B 3/22; H01B 11/22; H01B 3/441; H01B 3/28; C08L 91/00
See application file for complete search history.

(56) References Cited

U.S. PATENT DOCUMENTS 3,893,962 A 7/1975 Walton et al.
3,984,574 A 10/1976 Comollo
(Continued)

FOREIGN PATENT DOCUMENTS

| CA | 1117678 A | 2/1982 |
| CN | 104629112 A | 5/2015 |
| CN | 104992756 A | 10/2015 |

OTHER PUBLICATIONS

Huiliang et al "Green environment friendly optical cable filing paste for optical cable and preparation method thereof", CN 104992756 (Year: 2015).*

*Primary Examiner* — Ellen E Kim
(74) *Attorney, Agent, or Firm* — Quarles & Brady LLP

(57) ABSTRACT

A flooding composition comprising in weight percent (wt %) based on the weight of the composition: (A) 10-80 wt % of a first component comprising a polyolefin elastomer; and (B) 20-90 wt % of a second component comprising a bio-based fluid.

15 Claims, 3 Drawing Sheets

(51) Int. Cl.
  *H01B 3/22*   (2006.01)
  *H01B 7/285*  (2006.01)
  *C08L 91/00*  (2006.01)
  *H01B 11/22*  (2006.01)
  *H01B 3/28*   (2006.01)

(52) U.S. Cl.
  CPC ............ *H01B 7/285* (2013.01); *H01B 11/22* (2013.01); *H01B 3/28* (2013.01)

(56) References Cited

U.S. PATENT DOCUMENTS

| | | |
|---|---|---|
| 4,356,342 A | 10/1982 | Verne |
| 4,711,523 A * | 12/1987 | Iri .......................... H01B 7/288 385/109 |
| 5,246,783 A | 9/1993 | Spenadel et al. |
| 5,272,236 A | 12/1993 | Lai et al. |
| 5,278,272 A | 1/1994 | Lai et al. |
| 5,618,882 A | 4/1997 | Hammond et al. |
| 5,940,570 A | 8/1999 | Sigworth et al. |
| 5,986,028 A | 11/1999 | Lai et al. |
| 6,085,009 A | 7/2000 | Risch et al. |
| 6,496,629 B2 | 12/2002 | Ma et al. |
| 6,714,707 B2 | 3/2004 | Rossi et al. |
| 6,841,643 B2 | 1/2005 | Toyoda et al. |
| 8,192,813 B2 * | 6/2012 | Runyan ................... B29C 71/04 428/35.7 |
| 2004/0081795 A1 | 4/2004 | Wang et al. |
| 2007/0272426 A1 * | 11/2007 | Dell'Anna ................ H01B 3/20 174/25 C |
| 2012/0149798 A1 * | 6/2012 | Saito ................... C08F 214/186 522/54 |
| 2014/0296423 A1 * | 10/2014 | Ebata .................... C08F 210/18 524/554 |
| 2015/0292668 A1 * | 10/2015 | Abbasov ................ B05D 7/146 138/146 |

* cited by examiner

FLOODING COMPOSITIONS COMPRISING BIO-BASED FLUIDS

FIELD OF THE INVENTION

This invention relates to flooding compositions. In one aspect the invention relates to flooding compositions comprising a polyolefin elastomer and an oil while in another aspect, the invention relates to a flooding composition in which the oil is derived from a natural source such as plant, animal or algae.

BACKGROUND OF THE INVENTION

Flooding compositions are materials designed to occupy void spaces in telecommunication cables, such as the void spaces typically found around and between buffer tubes commonly used in fiber optic cables. Additionally, these compositions can be used as filling materials to suspend and protect optical fibers inside buffer tubes. Flooding compositions are free-flowing at elevated temperatures (such as those temperatures used when filling a telecommunication cable), and easily gel at lower temperatures to avoid dripping at room temperature. Additionally, easy-to-clean and non-messy flooding compositions are desirable for ease of installation and prevention of environmental contamination. Although advances have been made in the art of flooding compounds, improvements are still desired.

Another important property of a flooding composition is its compatibility with polymer materials used in cable constructions such as polyolefin, i.e., low gel pickup for good property retention and cable longevity. Current commercial flooding compounds are based on synthetic hydrocarbons; they are messy, grease/wax-like materials that stick to surfaces that come in contact with them. In case of a spill, they are not environmentally friendly. The wire and cable industry has a continuing interest in flooding compositions that exhibit reduced stickiness, reduced absorption into materials used in the manufacture of cable components such as buffer tubes, jackets, etc., and more environmental friendly.

SUMMARY OF THE INVENTION

In one embodiment the invention is a flooding composition comprising in weight percent (wt %) based on the weight of the composition:

(A) 10-80 wt % of a first component comprising a polyolefin elastomer; and (B) 20-90 wt % of a second component comprising a bio-based fluid.

In one embodiment, the flooding composition further comprises one or more additives, e.g., an antioxidant, a thixotropic agent, etc. In one embodiment, the second component is a mixture of a bio-based fluid and a petroleum-based oil.

DETAILED DESCRIPTION OF THE PREFERRED EMBODIMENT

Definitions

Figure 1:
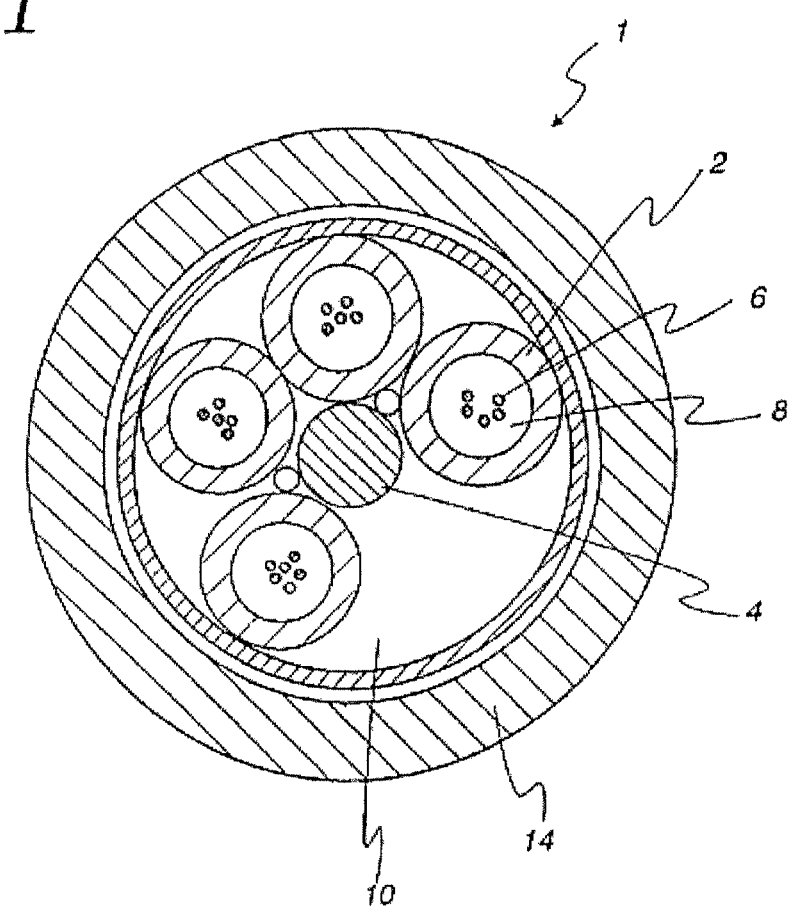
FIG. 1 is a cross-sectional view of a loose buffer tube fiber optic cable.

For purposes of United States patent practice, the contents of any referenced patent, patent application or publication are incorporated by reference in their entirety (or its equivalent U.S. version is so incorporated by reference) especially with respect to the disclosure of definitions (to the extent not inconsistent with any definitions specifically provided in this disclosure) and general knowledge in the art.

Any reference to the Periodic Table of Elements is that as published by CRC Press, Inc., 1990-1991. Reference to a group of elements in this table is by the new notation for numbering groups.

Unless stated to the contrary, implicit from the context, or customary in the art, all parts and percents are based on weight and all test methods are current as of the filing date of this disclosure.

The numerical ranges in this disclosure include all values from, and including, the lower and upper value. For ranges containing explicit values (e.g., 1 or 2; or 3 to 5; or 6; or 7), any subrange between any two explicit values is included (e.g., 1 to 2; 2 to 6; 5 to 7; 3 to 7; 5 to 6; etc.).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

"Bio-based fluid" and like terms mean a fluid derived from a biological source, such as a plant, animal, bacteria, yeast, algae, and the like. Bio-based fluids can comprise a single bio-based fluid, i.e., a fluid derived from a single biological source, or a blend of two or more bio-based fluids, i.e., a fluid derived from two or more biological sources. Bio-based fluids are liquid under ambient conditions (23° C. and atmospheric pressure), or have a wax-like consistency under ambient conditions (23° C. and atmospheric pressure) and become liquid upon heating.

"Wire" and like terms mean a single strand of conductive metal, e.g., copper or aluminum, or a single strand of optical fiber.

"Cable," "power cable" and like terms mean at least one wire or optical fiber within a sheath, e.g., an insulation covering or a protective outer jacket. Typically, a cable is two or more wires or optical fibers bound together, typically in a common insulation covering and/or protective jacket. The individual wires or fibers inside the sheath may be bare, covered or insulated. Combination cables may contain both electrical wires and optical fibers. The cable can be designed for low, medium, and/or high voltage applications. Typical cable designs are illustrated in U.S. Pat. Nos. 5,246,783; 6,496,629 and 6,714,707.

"Residue," when referring to a monomer, means that portion of a monomer molecule which resides in a polymer molecule as a result of being polymerized with another monomer or comonomer molecule to make the polymer molecule.

"Composition" and like terms mean a mixture or blend of two or more components.

In one embodiment the invention is a flooding composition comprising in weight percent (wt %) based on the weight of the composition:

(A) 10-80 wt % of a first component comprising a polyolefin elastomer; and (B) 20-90 wt % of a second component comprising a bio-based fluid.

Polyolefin Elastomer

The first component of the flooding compositions of this invention is a polyolefin elastomer. As known in the art, an "elastomer" is a polymer that experiences large reversible deformations under relatively low stress. Elastomers can either be thermoplastic or thermoset. "Thermoplastic elastomers" are elastomers having thermoplastic properties. That is, thermoplastic elastomers are optionally molded or otherwise shaped and reprocessed at temperatures above their melting or softening point. The polyolefin elastomers suitable for use herein are thermoplastic elastomers.

A "polyolefin elastomer" is an elastomeric polymer containing residues of alpha-olefin ("α-olefin") monomers. In various embodiments, the polyolefin elastomers consist of only α-olefin monomer residues, including ethylene. Such polyolefin elastomers can be either homopolymers or interpolymers. As used herein, "polymer" means a macromolecular compound prepared by reacting (i.e., polymerizing) monomers of the same or different type, and includes homopolymers and interpolymers. "Interpolymer" means a polymer prepared by the polymerization of at least two different monomer types. This generic term includes copolymers (usually employed to refer to polymers prepared from two different monomer types), and polymers prepared from more than two different monomer types (e.g., terpolymers (three different monomer types) and tetrapolymers (four different monomer types), etc.). As used herein, "homopolymer" denotes a polymer comprising repeating units derived from a single monomer type, but does not exclude residual amounts of other components used in preparing the homopolymer, such as chain transfer agents.

Polyolefin elastomers include both polyolefin homopolymers and interpolymers. Examples of polyolefin homopolymers are homopolymers of ethylene and propylene. Examples of polyolefin interpolymers are ethylene/α-olefin interpolymers and propylene/α-olefin interpolymers. In such embodiments, the α-olefin can be a $C_{3-20}$ linear, branched or cyclic α-olefin (for the propylene/α-olefin interpolymers, ethylene is considered an α-olefin). Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, resulting in an α-olefin such as 3-cyclohexyl-1-propene (allyl cyclohexane) and vinyl cyclohexane. Illustrative polyolefin copolymers include ethylene/propylene, ethylene/butene, ethylene/1-hexene, ethylene/1-octene, and the like. Illustrative terpolymers include ethylene/propylene/1-octene, ethylene/propylene/butene, and ethylene/butene/1-octene. In an embodiment, the polyolefin elastomer is an ethylene/octene copolymer. Additionally, the copolymers can be random or blocky.

Polyolefin elastomers can also comprise one or more functional groups such as an unsaturated ester or acid or silane, and these elastomers (polyolefins) are well known and can be prepared by conventional high-pressure techniques. The unsaturated esters can be alkyl acrylates, alkyl methacrylates, or vinyl carboxylates. The alkyl groups can have 1 to 8 carbon atoms and preferably have 1 to 4 carbon atoms. The carboxylate groups can have 2 to 8 carbon atoms and preferably have 2 to 5 carbon atoms. The portion of the copolymer attributed to the ester comonomer can be in the range of 1 up to 50 percent by weight based on the weight of the copolymer. Examples of the acrylates and methacrylates are ethyl acrylate, methyl acrylate, methyl methacrylate, t-butyl acrylate, n-butyl acrylate, n-butyl methacrylate, and 2-ethylhexyl acrylate. Examples of the vinyl carboxylates are vinyl acetate, vinyl propionate, and vinyl butanoate. Examples of the unsaturated acids include acrylic acids or maleic acids. One example of an unsaturated silane is vinyl trialkoxysilane.

Functional groups can also be included in the polyolefin elastomer through grafting which can be accomplished as is commonly known in the art. In one embodiment, grafting may occur by way of free radical functionalization which typically includes melt blending the polyolefin elastomer, a free radical initiator (such as a peroxide or the like), and a compound containing a functional group. During melt blending, the free radical initiator reacts (reactive melt blending) with the polyolefin elastomer to form polymer radicals. The compound containing a functional group bonds to the backbone of the polymer radicals to form a functionalized polymer. Exemplary compounds containing functional groups include but are not limited to alkoxysilanes (e.g., vinyl trimethoxysilane, vinyl triethoxysilane) and vinyl carboxylic acids and anhydrides (e.g., maleic anhydride).

Commercial examples of polyolefin elastomers useful herein include very-low-density polyethylene ("VLDPE") (e.g., FLEXOMER™ ethylene/1-hexene polyethylene made by The Dow Chemical Company); homogeneously branched, linear ethylene/α-olefin copolymers (e.g. TAFMER™ by Mitsui Petrochemicals Company Limited and EXACT™ by Exxon Chemical Company); homogeneously branched, substantially linear ethylene/α-olefin copolymers (e.g., AFFINITY™ and ENGAGE™ polyethylene available from The Dow Chemical Company); amorphous polyolefins (APOs) (e.g., EASTOFLEX™ amorphous propylene homopolymer available from Eastman Chemical Company); and combinations thereof. In various embodiments, the polyolefin elastomers are the homogeneously branched linear and substantially linear ethylene copolymers. The substantially linear ethylene copolymers are especially preferred, and are more fully described in U.S. Pat. Nos. 5,272,236; 5,278,272 and 5,986,028. In another embodiment, the polyolefin elastomers are amorphous polyolefins, such as those more fully described in US Pub. No. 2004/0081795.

The polyolefin elastomers useful herein also include propylene-, butene-, and other alkene-based copolymers. Such copolymers comprise a majority (i.e., greater than 50 weight percent ("wt %")) of units derived from the alkene (e.g., propylene) and a minority of units derived from another α-olefin (including ethylene). In an embodiment, the polyolefin elastomer includes a propylene-based copolymer. In further embodiments, the polyolefin elastomer comprises a propylene-ethylene copolymer. Exemplary propylene-based copolymers useful herein include VERSIFY™ polymers available from The Dow Chemical Company, and VISTAMAXX™ polymers available from ExxonMobil Chemical Company.

Polyolefin elastomers can also include ethylene-propylene-diene monomer ("EPDM") elastomers and chlorinated polyethylenes ("CPE"). Commercial examples of suitable EPDMs include NORDEL™ EPDMs, available from The Dow Chemical Company. Commercial examples of suitable CPEs include TYRIN™ CPEs, available from The Dow Chemical Company.

In one or more embodiments, the polyolefin elastomer is selected from the group consisting of ethylene-based polyolefin elastomers, propylene-based polyolefin elastomers, and combinations thereof. In such embodiments, the ethylene-based polyolefin elastomer can have an ethylene content of greater than 50 wt %, or greater than 60 wt %, based on the entire weight of the ethylene-based polyolefin elastomer, with the balance consisting of one or more alpha-olefin monomers. Additionally, the ethylene-based polyolefin elastomer can have an ethylene content ranging from greater than 50 wt % to 90 wt %, or from 60 wt % to 75 wt %, based on the entire weight of the ethylene-based polyolefin elastomer, with the balance consisting of one or more alpha-olefin monomers. In various embodiments, the alpha-olefin monomer is octene.

Furthermore, when the polyolefin elastomer is propylene-based, it can have a propylene content of greater than 50 wt %, greater than 70 wt %, or greater than 90 wt %, based on the entire weight of the propylene-based polyolefin elastomer, with the balance consisting of one or more alpha-olefin monomers (including ethylene). Additionally, the propylene-based polyolefin elastomer can have a propylene content ranging from greater than 50 to 99 wt %, from 70 to 98 wt %, or from 90 to 97 wt %, based on the entire weight of the propylene-based polyolefin elastomer, with the balance consisting of one or more alpha-olefin monomers (including ethylene). In various embodiments, when the polyolefin elastomer is propylene-based, the alpha-olefin comonomer is ethylene. Nonlimiting examples of a suitable propylene-based polyolefin elastomer include propylene copolymer and propylene homopolymer.

In one or more embodiments, the polyolefin elastomer includes an ethylene/octene copolymer and an amorphous propylene homopolymer.

In one or more embodiments, the polyolefin elastomer includes a propylene/ethylene copolymer and an amorphous propylene homopolymer.

In one or more embodiments, the polyolefin elastomers suitable for use herein can have a degree of crystallinity in the range of from 0.01 to less than 50 wt %, from 0.5 to 40 wt %, or from 10 to 35 wt %, or from 11 to 32 wt %. In other embodiments, the polyolefin elastomers can have a degree of crystallinity in the range of from 10 to less than 50 wt %, from 10 to 40 wt %, or from 20 to 35 wt %. The degree of crystallinity of the polyolefin elastomer is measured by the method described in the Test Methods section, below.

Polyolefin elastomers suitable for use herein can have a Brookfield viscosity of 50,000 centipoise ("cps" or "cP") or less, or in the range of from 1,000 to 50,000 cps, from 1,000 to 40,000 cps, or from 1,000 to 30,000 cps, or from 1,000 to 10,000 cps. Brookfield viscosity for polyolefin elastomers is determined in accordance with the procedure provided in the Test Methods, below, at 350° F. (176.6° C.) using a Brookfield viscometer with an SC-31 hot-melt spindle.

Polyolefin elastomers suitable for use herein can have a number-average molecular weight ("Mn") of greater than 2,000 g/mol, at least 4,000 g/mol, or at least 5,000 g/mol. Additionally, the polyolefin elastomers can have an Mn in the range of from 2,000 to 60,000 g/mol, or from 4,000 to 50,000 g/mol, or from 5,000 to 35,000 g/mol, or from 7,000 to 20,000 g/mol, or from 7,000 to 15,000 g/mol. Mn is determined according to the gel-permeation-chromatography method described in the Test Methods section, below.

Polyolefin elastomers suitable for use herein can have a weight-average molecular weight ("Mw") ranging from 1,000 to 100,000 g/mol, or from 5,000 to 50,000 g/mol, or from 8,000 to 30,000 g/mol. Mw is determined according to the gel-permeation-chromatography method described in the Test Methods section, below.

Polyolefin elastomers suitable for use herein can have a polydispersity index ("PDI" or "Mw/Mn") ranging from 0.2 to 20, from 0.5 to 10, or from 1 to 5. PDI is determined according to the gel-permeation-chromatography method described in the Test Methods section, below.

Polyolefin elastomers suitable for use herein can have a density of less than 0.930 $g/cm^3$, or less than 0.920 $g/cm^3$, or less than 0.910 $g/cm^3$, or less than 0.900 $g/cm^3$. Additionally, the polyolefin elastomers can have a density of at least 0.850 $g/cm^3$, or at least 0.860 $g/cm^3$, or at least 0.870 $g/cm^3$, or at least 0.880 $g/cm^3$, or at least 0.890 $g/cm^3$. Density is determined according to ASTM D 792.

Polyolefin elastomers suitable for use herein can have a melting point of at least 50° C., or at least 55° C., or at least 60° C., or at least 65° C., or at least 70° C., or at least 75° C., or at least 80° C., or at least 85° C., or at least 90° C., or at least 95° C., or at least 100° C. The melting point of suitable polyolefin elastomers can be as high as 120° C., or as high as 150° C., or as high as 155° C., or as high as 160° C. Melting point is determined according to the method described in the Test Methods section, below.

Polyolefin elastomers suitable for use herein can have a B value in the range of from 0.1 to 2.0, from 0.5 to 1.5, or from 0.7 to 1.0. B value is determined according to the method described in the Test Methods section, below.

Polyolefin elastomers suitable for use herein can have a crystallization temperature ("Tc") in the range of from 30 to 100° C., or 35 to 80° C., or from 50 to 75° C. Crystallization temperature is determined according to the method described in the Test Methods section, below.

Polyolefin elastomers suitable for use herein can have one, some, or all of the following properties:

(a) a degree of crystallinity from 0.01, or 10 to 35, or less than 50 wt %;

(b) a Brookfield viscosity from 1,000 to 7,000, or 50,000 cps;

(c) a Mn from 2,000, or 7,000 to 55,000, or 60,000 g/mol;

(d) a Mw from 1,000 to 100,000 g/mol;

(e) a Mw/Mn from 0.2 to 20;

(f) a density from 0.850, or 0.860 to 0.890, or 0.930 $g/cm^3$;

(g) a melting point (Tm) from 50, or 55 to 155, or 160° C.;

(h) a B value from 0.1 to 2.0; and/or (i) a crystallization temperature (Tc) from 30 to 75, or 100° C.

A specific example of a suitable ethylene-based polyolefin elastomer is an ethylene/octene copolymer having a Brookfield viscosity of 8,200 cps and a density of 0.889 $g/cm^3$. A specific example of a suitable propylene-based polyolefin elastomer is a propylene/ethylene copolymer having a Brookfield viscosity of 1,000 cps and a density of 0.884 $g/cm^3$.

Bio-Based Fluid

The second component of the flooding compositions of this invention is a bio-based fluid (also referred to as an oil). While any bio-based fluid can be used in the practice of this invention, fluids derived from vegetable or algae are preferred. Common sources of the bio-based fluids used in the practice of this invention include, but are not limited to, coconut, corn, cottonseed, rapeseed (of which Canola oil is one variety), olive, peanut, safflower, sesame, soybean, sunflower, mustard and algae. The oil is extracted and processed from the biological material using known techniques and equipment.

In one embodiment, all or some of the bio-based fluid is functionalized by a known process to produce a functionalized oil, such as a fatty acid methyl ester (FAME) or an epoxidized fatty acid methyl ester (eFAME). A "fatty acid methyl ester" ("FAME") is a fatty acid ester typically formed by transesterifying an oil, such as with methanol. An combined amount of polyunsaturated fatty acid and monounsaturated fatty acid present in the bio-based fluid, based on the total amount of fatty acid in the bio-based fluid. A "fatty acid" is a carboxylic acid with a long aliphatic tail that is either saturated or unsaturated. Unsaturated fatty acids have one or more double bonds between carbon atoms. A "monounsaturated fatty acid" has one double bond between carbon atoms. A "polyunsaturated fatty acid" has more than one double bond between carbon atoms. Saturated fatty acids do not contain any double bonds.

Table 1 reports literature data on the percent unsaturation for typical vegetable oils.

TABLE 1

Reported Literature % Unsaturation for Various Vegetable Oils

| Oil Type | Polyunsaturated Fatty Acids (%) | Monounsaturated Fatty Acids (%) | Total Unsaturated Fatty Acids (%) |
|---|---|---|---|
| Canola Oil | 33* | 55* | 88* |
| Safflower Oil | 75* | 12* | 86* |
| Sunflower Oil | 66* | 20* | 86* |
| Sunflower Oil (~65% linoleic) | 65.7◊ | 19.5◊ | 85◊ |
| Corn Oil | 59* | 24* | 83* |
| Corn Oil | 54.68◊ | 27.57◊ | 82◊ |
| Olive Oil | 10.53◊ | 72.96◊ | 83◊ |
| Olive Oil | 8* | 74* | 82* |
| Soybean Oil | 58* | 23* | 81* |
| Soybean Oil | 37.6◊ | 43.0◊ | 81◊ |
| Sesame Oil | 41.7◊ | 39.7◊ | 81◊ |
| Mustard Oil | 21.2° | 59.2° | 80.4° |
| Peanut Oil | 32* | 46* | 78* |
| Peanut Oil | 32.0◊ | 46.2◊ | 78◊ |
| Cottonseed Oil | 52* | 18* | 70* |
| Palm Oil | 9* | 37* | 46* |
| Coconut Oil | 2* | 6* | 8* |
| Palm Kernel Oil | 2* | 11* | 13* |

Values are provided as a percent representing the amount of polyunsaturated or monounsaturated fatty acid, based on the total amount of fatty acid in the oil.
*Source: NutriStrategy, *Fats, Cooking Oils and Fatty Acids*, 2015, available at http://www.nutristrategy.com/fatsoils.htm.
◊Source: Your Dictionary, *Examples of Unsaturated Fats*, available at http://examples.yourdictionary.com/examples-of-unsaturated-fats.html.
°Source: United States Dep't of Ag., *National Nutrient Database for Standard Reference Release 28: Basic Report: 04583, Oil, Mustard*, May 2016, available at https://ndb.nal.usda.gov/ndb/foods/show/719?manu=&fgcd=.

"epoxidized fatty acid methyl ester" ("eFAME") is a fatty acid ester with at least one epoxide group. An "epoxide group" is a three-member cyclic ether (also called oxirane or an alkylene oxide) in which an oxygen atom is joined to each of two carbon atoms that are already bonded to each other. Epoxidation reactions are typically performed with percarboxylic acids or other peroxy compounds. In one or more embodiments, the bio-based fluid contains a functionalized bio-based fluid. In an embodiment, when the bio-based fluid contains a functionalized bio-based fluid, the bio-based fluid contains from greater than 0 to 100 wt %, or from 20 to 80 wt %, or from 40 to 60 wt %, or 50 wt % of the functionalized bio-based fluid, and from 0 to less than 100 wt %, or from 20 to 80 wt %, or from 40 to 60 wt %, or 50 wt % of a non-functionalized bio-based fluid, based on the total weight of bio-based fluid. In another embodiment, the bio-based fluid excludes functionalized bio-based fluids.

In one embodiment, the bio-based fluid has a total unsaturation level that is greater than 30%, or greater than 40%, or greater than 45%, or greater than 50%, or greater than 70%, or greater than 75%, or greater than 80%. In another embodiment, the bio-based fluid has a total unsaturation level from 30%, or 40%, or 45%, or 50%, or 70%, or 75%, or 80%, or 85% to 90%, or 95%, or 99%. The total unsaturation level is provided as a percent representing the In one or more embodiments, the bio-based oil can have a flash point from 200° C., or 220° C., or 240° C., or 250° C., or 270° C., or 280° C., or 285° C. to 300° C., or 315° C., or 320° C., or 350° C., measured according to ASTM D92. In one or more embodiments, the bio-based oil can have a flash point that is greater than 200° C., or greater than 250° C., or greater than 280° C., or greater than 285° C., or greater than 290° C., or greater than 300° C., or greater than 310° C., or equal to or greater than 315° C., measured according to ASTM D92.

In one or more embodiments, the bio-based oil can have a kinematic viscosity of 500 centistokes ("cSt") or less, or 200 cSt or less, or 100 cSt or less, or 50 cSt or less at 40° C. In one embodiment, the bio-based oil has a kinematic viscosity from 10 cSt, or 15 cSt, or 20 cSt, or 30 cSt to 40 cSt, or 50 cSt, or 100 cSt, or 200 cSt, or 500 cSt at 40° C. Viscosity of the bio-based oil is measured according to ASTM D445.

Bio-based fluid suitable for use herein can have one, some, or all of the following properties:

(a) a total unsaturation level from 30%, or 40%, or 45% to 95%, or 99%;

(b) a flash point from 200, or 250, or 280 to 315, or 320, or 350° C.; and/or (c) a kinematic viscosity from 10 cSt, or 30 cSt to 50 cSt, or 500 cSt.

In one embodiment, the bio-based oil is an oil extracted from a single biological source, e.g., soybean, or corn, or algae, etc. In one embodiment the bio-based oil is a blend of oils extracted from two or more sources, e.g., soybean and corn, or soybean and algae, etc. Algae oil typically has a total unsaturation level of 90% or greater.

In one embodiment, the second component is a blend or mixture of a bio-based fluid and a petroleum-based oil. These petroleum-based oils are hydrocarbon oils known in the art of flooding compositions. Typical examples of hydrocarbon oils include mineral oils (e.g., paraffinic oils, naphthenic oils, and aromatic oils) and low-molecular-weight polyolefin oils (e.g., polybutene oil). In an embodiment, the hydrocarbon oil is a paraffinic oil.

The hydrocarbon oil, if present, can have a number-average molecular weight ("Mn") of 2,000 g/mol or less, or 1,000 g/mol or less, or 800 g/mol or less.

The hydrocarbon oil, if present, can have a kinematic viscosity of 500 centistokes ("cSt") or less, or 200 cSt or less, or 100 cSt or less, or 50 cSt or less at 40° C. In one embodiment, the hydrocarbon oil, if present, has a kinematic viscosity from 10 cSt, or 15 cSt, or 20 cSt to 30 cSt, or 40 cSt, or 50 cSt, or 100 cSt, or 200 cSt, or 500 cSt at 40° C. Viscosity of the hydrocarbon oil is measured according to ASTM D445.

An example of a suitable commercially available hydrocarbon oil is SUNPAR™ 110, which has a kinematic viscosity of 21.2 cSt at 40° C., available from Sunoco Inc., Pittsburgh, Pa., USA.

If a petroleum-based oil is used in combination with the bio-based fluid, then typically the bio-based fluid comprises at least 5, more typically greater than 10, or greater than 30, or 40, or 50 wt % of the blend of bio-based fluid and petroleum-based oil. In one embodiment, if a petroleum-based oil is used in combination with the bio-based fluid, then typically the bio-based fluid comprises from 5, or 10, or 30, or 40, or 50 to 60, or 70, or 80, or 90, or 95, or 99 wt % of the blend of bio-based fluid and petroleum-based oil.

In one embodiment, the second component is a blend or mixture of a bio-based fluid and a polyα-olefin oil. A "polyα-olefin oil" ("PAO oil") is a synthetic compound produced by polymerizing at least one α-olefin and is a liquid at 22° C. and 1 atmosphere of pressure. The α-olefin may be any α-olefin disclosed herein, such as $C_2$, $C_6$, $C_8$, $C_{10}$, $C_{12}$, $C_{14}$, and $C_{20}$ α-olefins. These are PAO oils known in the art of flooding compositions. Typical examples of PAO oils include hydrogenated dec-1-ene homopolymer (e.g., DURASYN™ 1801 and DURASYN™ 180R, available from INEOS) and hydrogenated 1-tetradecene polymer with 1-dodecene (e.g., DURASYN™ 126, available from INEOS).

The PAO oil, if present, can have a kinematic viscosity of 1,500 centistokes ("cSt") or less, or 1,000 cSt or less, or 500 cSt or less, or 200 cSt or less, or 100 cSt or less, or 50 cSt or less, or 10 cSt or less at 40° C. In one embodiment, the PAO oil, if present, has a kinematic viscosity from 10 cSt, or 15 cSt, or 20 cSt, or 30 cSt to 40 cSt, or 50 cSt, or 100 cSt, or 200 cSt, or 500 cSt, or 1,000 cSt, or 1,300 cSt, or 1,500 cSt at 40° C. Viscosity of the PAO oil is measured according to ASTM D445.

If a PAO oil is used in combination with the bio-based fluid, then typically the bio-based fluid comprises at least 5, more typically greater than 10, or greater than 20, or 30, or 40, or 50, or 60, or 70, or 75, or 80, or 85 wt % of the blend of bio-based fluid and PAO oil. In one embodiment, if a PAO oil is used in combination with the bio-based fluid, then typically the bio-based fluid comprises from 5, or 10, or 14, or 20, or 30, or 40, to 50, or 60, or 70, or 75, or 80, or 90, or 95, or 99 wt % of the blend of bio-based fluid and PAO oil.

Additives

In one embodiment the flooding composition can optionally comprise one or more additives selected such as, but not limited to, antioxidants, rheology modifiers (e.g., thixotropic agents), stabilizers (e.g., UV stabilizers), mineral fillers, polymer fillers, and combinations thereof.

Antioxidants, when employed, can be present in any conventional amount, such as an amount ranging from 0.01 to 1 wt %, or from 0.01 to 0.3 wt %, based on the total weight of the flooding composition. Suitable antioxidants include, but are not limited to, hindered phenols such as tetrakis [methylene(3,5-di-tert-butyl-4-hydroxyhydrocinnamate)] methane; bis[(beta-(3,5-ditert-butyl-4-hydroxybenzyl)methylcarboxyethyl)]-sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)-hydrocinnamate; phosphites and phosphonites such as tris(2,4-di-tert-butylphenyl) phosphite and di-tert-butylphenyl-phosphonite; thio compounds such as dilaurylthiodipropionate, dimyristylthiodipropionate, and distearylthiodipropionate; various siloxanes; polymerized 2,2,4-trimethyl-1,2-dihydroquinoline, n,n'-bis(1,4-dimethylpentyl-p-phenylenediamine), alkylated diphenylamines, 4,4'-bis(alpha, alpha-dimethylbenzyl)diphenylamine, diphenyl-p-phenylenediamine, mixed di-aryl-p-phenylenediamines, and other hindered amine anti-degradants or stabilizers. In one embodiment, the antioxidant is [3-(3,5-di-tert-butyl-4-hydroxyphenyl)propionate], commercially available as IRGANOX™ 1035 from BASF.

Thixotropic agents, when employed, can be present in any conventional amount, such as an amount ranging from greater than 0 to 5, or 6 wt %, based on the total weight of the flooding composition. An example of a suitable thixotropic agent includes, but is not limited to, fumed silica. Suitable commercial thixotropic agents include, but are not limited to, AEROSIL™ products from Evonik Corp. BYK Industries and Kusumoto Chemicals also supply suitable commercial thixotropic agents.

In various embodiments, the flooding composition can be free or substantially free of thixotropic agents. As used herein, the term "substantially free" shall mean a concentration of less than 10 parts per million by weight based on the total weight of the flooding composition.

In various embodiments, the flooding composition can comprise one or more fillers. Such fillers include, but are not limited to, hollow microspheres (e.g., glass or polymeric), mineral inorganic compounds, polymeric fillers, and the like. When employed, fillers can be present in any conventional amount, such as an amount ranging from greater than 0 up to 60 wt %.

Flooding Composition

The flooding composition can be prepared by simple compounding techniques known in the art. For instance, the polyolefin elastomer, the bio-based fluid (including any petroleum-based oil) and any optional additives can be compounded in a liquid operational mixer with temperature control. For instance, the ingredients can be compounded in a batch or continuous mixer. Suitable batch mixers include, but are not limited to, Banbury™, Silverson™, Dynamix™ tank mixers and agitators, and Littleford™ batch mixers. Continuous mixers include twin and single-screw extruders, Farrel™ mixers, and Buss™ co-kneaders.

The above-described polyolefin elastomer, or blends thereof, can be present in the flooding compound in an amount ranging from 10 to 80 wt %, from 20 to 60 wt %, or from 20 to 40 wt %, or from 25 to 40 wt %, or from 20 to 30 wt %, or from 30 to 50 wt %, based on the combined weight of the polyolefin elastomer and bio-based fluid (including any petroleum-based oil).

The above-described bio-based fluid (including any petroleum-based oil and/or PAO oil) can be present in the flooding composition in an amount ranging from 5 to 90 wt %, or from 20 to 80 wt %, or from 40 to 70 wt %, or from 50 to 80 wt %, or from 60 to 75 wt %, based on the combined weight of the polyolefin elastomer and bio-based fluid. In one embodiment, if a PAO oil and/or petroleum-based oil is used in combination with the bio-based fluid, then typically the bio-based fluid comprises from 5, or 10, or 14, or 20, or 30, or 40, to 50, or 60, or 70, or 75, or 80, or 90, or 95, or 99 wt % of the blend of bio-based fluid, and PAO oil and/or petroleum-based oil.

In one or more embodiments, the resulting flooding composition can have an apparent viscosity in the range of from 20 to equal to or greater than 1,000 centipoise ("cps"), from 50 to 1,000 cps, from 200 to 800 cps, or from 300 to 600 cps, as measured at 150° C. according to ASTM D3236. In one or more embodiments, the resulting flooding composition can have an apparent viscosity from 20 cps, or 30 cps, or 40 cps, or 45 cps, or 50 cps to 60 cps, or 70 cps, or 80 cps, or 90 cps, or 100 cps, or 110 cps, or 120 cps, or 130 cps, or 140 cps, or 150 cps, or 160 cps, or 170 cps, or 180 cps, or 190 cps, or 200 cps, or 225 cps, or 250 cps, or 280 cps, or 300 cps, as measured at 150° C. according to ASTM D3236.

In various embodiments, the flooding composition can have a drop point of at least 65° C., or at least 70° C., or at least 75° C., or at least 80° C., or at least 90° C., or at least 100° C., or at least 110° C., or at least 120° C. In one or more embodiments, the flooding composition has a drop point from greater than 90° C., or greater than 100° C., or greater than 110° C. to 120° C., or 130° C., or 140° C., or 150° C., or 160° C., or 200° C. Drop point is determined according to ASTM D127.

In various embodiments, the flooding composition can have an oil separation when aged for 24 hours at 21° C. of less than 0.1, or less than 0.05, or less than 0.01. In one or more embodiments, the flooding composition has an oil separation when aged for 24 hours at 21° C. from 0 to 0.01, or 0.05, or less than 0.1. In one or more embodiments, the flooding composition has no (i.e., 0) oil separation when aged for 24 hours at 21° C. Oil separation is determined according to ASTM D1742.

In one or more embodiments, the flooding composition contains:

(A) from 10, or 20 to 40, or 50, or 80 wt % of a first component comprising a polyolefin elastomer; and (B) from 20, or 50, or 60 to 70, or 75, or 90 wt % of a second component comprising a bio-based fluid, the bio-based fluid having a total unsaturation level from 30%, or 40%, or 45% to 95%, or 99%; and the flooding composition has one, some, or all of the following properties:

(i) an apparent viscosity from 20, or 50 to 250, or 280 cps, or 300 cps at 150° C.;

(ii) a drop point from greater than 90° C., or greater than 100° C., or greater than 110° C. to 120° C., or 130° C., 200° C.; and/or (iii) an oil separation when aged for 24 hours at 21° C. from 0 to 0.01, or less than 0.1.

It is understood that the sum of the components in the composition yields 100 weight percent.

Fiber Optic Cable

In various embodiments, a fiber optic cable, also known as an optical fiber cable, can be prepared that comprises at least one optical fiber, a plurality of buffer tubes, and the above-described flooding composition.

A cross-sectional view of a common loose-buffer-tube optical fiber cable is shown in FIG. 1. In this design of optical fiber cable 1, buffer tubes 2 are positioned radially around a central strength member 4, with a helical rotation to the tubes in the axial length. The helical rotation allows bending of the cable without significantly stretching the tube or the optic fibers 6.

If a reduced number of buffer tubes is required, then foamed filler rods can be used as low-cost spacers to occupy one or more empty buffer tube positions 10 to maintain cable geometry. The cable jacket 14 can generally be fabricated from a polyethylene-based material.

The above-described flooding composition can be used to fill the void spaces 8 surrounding optic fibers 6 within buffer tubes 2. Additionally, the flooding composition can be used to fill void spaces surrounding and between the buffer tubes 2, but within the cable jacket 14. The flooding composition provides the suspension and protection needed in the immediate environment surrounding the fibers, including eliminating air space. The flooding composition also provides a barrier against water penetration, which is detrimental to optic transmission performance.

Many other buffer tube cable designs are possible. The size and materials of construction for, the central strength and tensile member, the dimensions and number of buffer tubes, and the use of metallic armors and multiple layers of jacketing material are among the design elements. Such designs that incorporate a flooding composition are contemplated within the scope of the present disclosure.

In one or more embodiments, the buffer tubes are formed from polypropylene copolymer (cPP) (such as ESCORENE™ 7132, an impact copolymer available from Exxon Chemical Company).

In one or more embodiments, the cable jacket is formed from a high density polyethylene (HDPE) (such as DGDA-6318BK, available from The Dow Chemical Company, having a density of 0.954 g/cm$^3$). A "high density polyethylene" (or "HDPE") is an ethylene-based polymer having a density of at least 0.94 g/cc, or from at least 0.94 g/cc to 0.98 g/cc. The HDPE has a melt index from 0.1 g/10 min to 25 g/10 min, measured in accordance with ASTM D 1238, condition 190° C./2.16 kg.

An optical fiber cable, such as those described above, can typically be made in a series of sequential manufacturing steps. Optical transmission fibers are generally manufactured in the initial step. The fibers can have a polymeric coating for mechanical protection. These fibers can be assembled into bundles or ribbon cable configurations or can be directly incorporated into the cable fabrication.

Optical protective components can be manufactured using an extrusion fabrication process. Typically, a single screw plasticating extruder discharges a fluxed and mixed polymer under pressure into a wire and cable cross-head. The cross-head turns the melt flow perpendicular to the extruder and shapes the flow into the molten component. For buffer and core tubes, one or more optic fibers or fiber assemblies and flooding composition are fed into the back of the cross-head and exit the cross-head within the molten tube that is then cooled and solidified in a water trough system. This component is eventually collected as a finished component on a take-up reel.

To fabricate components comprised of two or more material layers, there typically would be separate plasticating extruders feeding the melt compositions into a multi-layer cross-head where it is shaped into the desired multi-layer construction.

Slotted core members and other profile extrusion components are typically extruded in a similar profile extrusion process incorporating an appropriate shaping die, and then subsequently combined with the optical fiber components to fabricate the finished cable.

To control excess fiber length, a tensioning system is used to feed the fiber components into the tube fabrication process. In addition, component materials selection, the tube extrusion and cross-head equipment, and processing conditions are optimized to provide a finished component where post extrusion shrinkage does not result in excessive slack in the optic fiber components.

The extruded optical protective components, along with other components such as central components, armors, wraps, are then subsequently processed in one or more steps to produce the finished cable construction. This typically includes processing on a cabling line where the components are assembled with a fabricating extruder/crosshead then used to apply the polymeric jacketing.

Test Methods

Density

Density is determined according to ASTM D792.

Melt Index

Melt index, or $I_2$, is measured in accordance with ASTM D 1238, condition 190° C./2.16 kg, and is reported in grams eluted per 10 minutes (g/10 min). The $I_{10}$ is measured in accordance with ASTM D 1238, condition 190° C./10 kg, and is reported in grams eluted per 10 minutes (g/10 min).

Differential Scanning Calorimetry (Crystallinity, Melting Point, Crystallization Temperature)

Differential Scanning calorimetry ("DSC") is used to measure crystallinity in the polymers (e.g., ethylene-based (PE) polymers). About 5 to 8 mg of polymer sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for polypropylene or "PP"). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (for example, % cryst.=($H_f$/292 J/g)×100 (for PE)).

Unless otherwise stated, melting point(s) ($T_m$) of each polymer is determined from the second heat curve (peak Tm), and the crystallization temperature ($T_c$) is determined from the first cooling curve (peak Tc).

Drop Point

Drop point is determined according to ASTM D127.

Viscosity

Apparent viscosity of the flooding compounds is determined according to ASTM D3236 at 150° C. Kinematic viscosity can be calculated by using apparent viscosity divided by fluid density.

Brookfield viscosity of polymer components (i.e., polyolefin elastomers) is determined in accordance with the following procedure using a Brookfield Laboratories DVII+ Viscometer in disposable aluminum sample chambers. The spindle used is an SC-31 hot-melt spindle, suitable for measuring viscosities in the range of from 10 to 100,000 centipoise (0.1 to 1,000 grams/(cm·second)). A cutting blade is employed to cut samples into pieces small enough to fit into the 1-inch wide, 5-inches long (2.5-cm wide, 13-cm long) sample chamber. The sample is placed in the chamber, which is in turn inserted into a Brookfield Thermosel and locked into place with bent needle-nose pliers. The sample chamber has a notch on the bottom that fits the bottom of the Brookfield Thermosel to ensure that the chamber is not allowed to turn when the spindle is inserted and spinning. The sample is heated to 350° F. (176.6° C.), with additional sample being added until the melted sample is about 1 inch (2.5 cm) below the top of the sample chamber. The viscometer apparatus is lowered and the spindle submerged into the sample chamber. Lowering is continued until brackets on the viscometer align on the Thermosel. The viscometer is turned on and set to a shear rate, which leads to a torque reading in the range of 30 to 60 percent. Readings are taken every minute for about 15 minutes, or until the values stabilize, then the final reading is recorded.

B Value

The B value is calculated as $B=P_{OE}/(2\times P_O P_E)$; where $P_E$ is a molar fraction of the ethylene component in the copolymer, $P_O$ is a molar fraction of the α-olefin component, and $P_{OE}$ is a molar fraction of α-olefin-ethylene sequences in the all dyad sequences, where the molar fraction of each component, except the terminal component, is a value calculated, and the B value is calculated based on a chart of C-NMR (270 MHz).

Oil Absorption

A 75-mil thick compression-molded specimen (~0.5×0.2 inches) (~12.7×5.08 mm) of jacket material (HDPE or polypropylene (e.g., cPP)) is immersed in the oil at 85° C. After 4 days, the oil covering the surface of the jacket material is wiped out and the weight gain of the jacket material plaque is calculated by comparing its weight before and after aging.

Gel Permeation Chromatography

A high-temperature gel permeation chromatography ("GPC") system is employed, equipped with Robotic Assistant Deliver ("RAD") system for sample preparation and sample injection. The concentration detector is an Infra-red detector (IR4) from Polymer Char Inc. (Valencia, Spain). Data collection is performed using Polymer Char DM 100 Data acquisition box. The carrier solvent is 1,2,4-trichlorobenzene ("TCB"). The system is equipped with an on-line solvent degas device from Agilent. The column compartment is operated at 150° C. The columns are four Mixed A LS 30-cm, 20-micron columns. The solvent is nitrogen-purged TCB containing approximately 200 ppm 2,6-di-t-butyl-4-methylphenol ("BHT"). The flow rate is 1.0 mL/min, and the injection volume is 200 microliters (μL). A 2 mg/mL sample concentration is prepared by dissolving the sample in nitrogen-purged and preheated TCB (containing 200 ppm BHT) for 2.5 hours at 160° C. with gentle agitation.

The GPC column set is calibrated by running twenty narrow molecular weight distribution polystyrene ("PS") standards. The molecular weight ("MW") of the standards ranges from 580 to 8,400,000 g/mol, and the standards are contained in six "cocktail" mixtures. Each standard mixture has at least a decade of separation between individual molecular weights. The equivalent polypropylene ("PP") molecular weights of each PS standard are calculated by using the following equation, with reported Mark-Houwink coefficients for polypropylene (Th. G. Scholte, N. L. J. Meijerink, H. M. Schoffeleers, and A. M. G. Brands, J. Appl.

Polym. Sci., 29, 3763-3782 (1984)) and polystyrene (E. P. Otocka, R. J. Roe, N. Y. Hellman, P. M. Muglia, Macromolecules, 4, 507 (1971)):

$$M_{PP} = \left(\frac{K_{PS} M_{PS}^{a_{PS}+1}}{K_{PP}}\right)^{\frac{1}{a_{PP}+1}}, \quad \text{(Eq 1)}$$

where $M_{pp}$ is PP equivalent MW, $M_{PS}$ is PS equivalent MW, log K and a values of Mark-Houwink coefficients for PP and PS are listed below.

| Polymer | a | log K |
|---|---|---|
| Polypropylene | 0.725 | −3.721 |
| Polystyrene | 0.702 | −3.900 |

A logarithmic molecular weight calibration is generated using a fourth order polynomial fit as a function of elution volume. Number average and weight average molecular weights are calculated according to the following equations:

$$M_n = \frac{\sum^i W f_i}{\sum^i (W f_i / M_i)}, \quad \text{(Eq 2)}$$

$$M_w = \frac{\sum^i (W f_i * M_i)}{\sum^i (W f_i)}, \quad \text{(Eq 3)}$$

where $Wf_i$ and $M_i$ are the weight fraction and molecular weight of elution component i, respectively.

Flash Point

Flash point is determined according to ASTM D92.

Oil Separation

After mixing the samples as described above, 50 milliliters (ml) of the melted sample is poured into a shallow aluminum pan and the sample is allowed to cool and solidify. Any oil separation will be visible on the surface after sitting for 24 hours at room temperature and the result is recorded.

By way of example, and not limitation, some embodiments of the present disclosure will now be described in detail in the following Examples.

EXAMPLES

A key requirement for cable flooding/filling compounds is oil absorption by cable components which are generally polyolefin based (e.g. buffer tube, jacket). For this reason polyolefin-compatible filling/flooding materials are higher cost as they are based on more expensive oils such as polyα-olefin oils (PAO) and polybutene (PIB, also known as isobutylene/butene copolymer). Lower cost compounds based on mineral/paraffinic oils have poor compatibility. The data in Table 2 shows that vegetable oils (e.g. soybean oil, canola) have desirably low viscosity (e.g. 32 cSt at 40° C. for soybean oil) suitable for viscosity modification of polyolefin elastomers for the manufacture of flooding and filling compounds. Such viscosities are comparable to that of paraffinic oil, as well as a higher cost PAO fluid (DURASYN™ 126, DURASYN™ 1801, and DURASYN™ 180R) and PIB fluid (Indopol™ L-14 and Indopol™ H-100). The vegetable oils also have a desirably much higher flash point versus paraffinic oils and PIB L-14.

TABLE 2

Selected Properties of Various Oils

| Oil | Supplier | Oil Type | Kinematic Viscosity at 40° C. (cSt) | Flash Point (° C.) | $M_n$ |
|---|---|---|---|---|---|
| SUNPAR ™ 110 | Sunoco | Paraffinic | 21 | 192 | |
| DURASYN ™ 126 | Ineos | PAO | 31 | 254 | |
| DURASYN ™ 180I | Ineos | PAO | 1,261 | 290 | |
| DURASYN ™ 180R | Ineos | PAO | 928 | 290 | |
| Soybean oil | Cargill | Vegetable | 32 | 288 | |
| Canola | | Vegetable | 42 | 315 | |
| Indopol ™ H-100 | Ineos | PIB | 215 @ 100° C. | 210 | 910 |
| Indopol ™ L-14 | Ineos | PIB | 27 | >138 | 370 |

Figure 2:
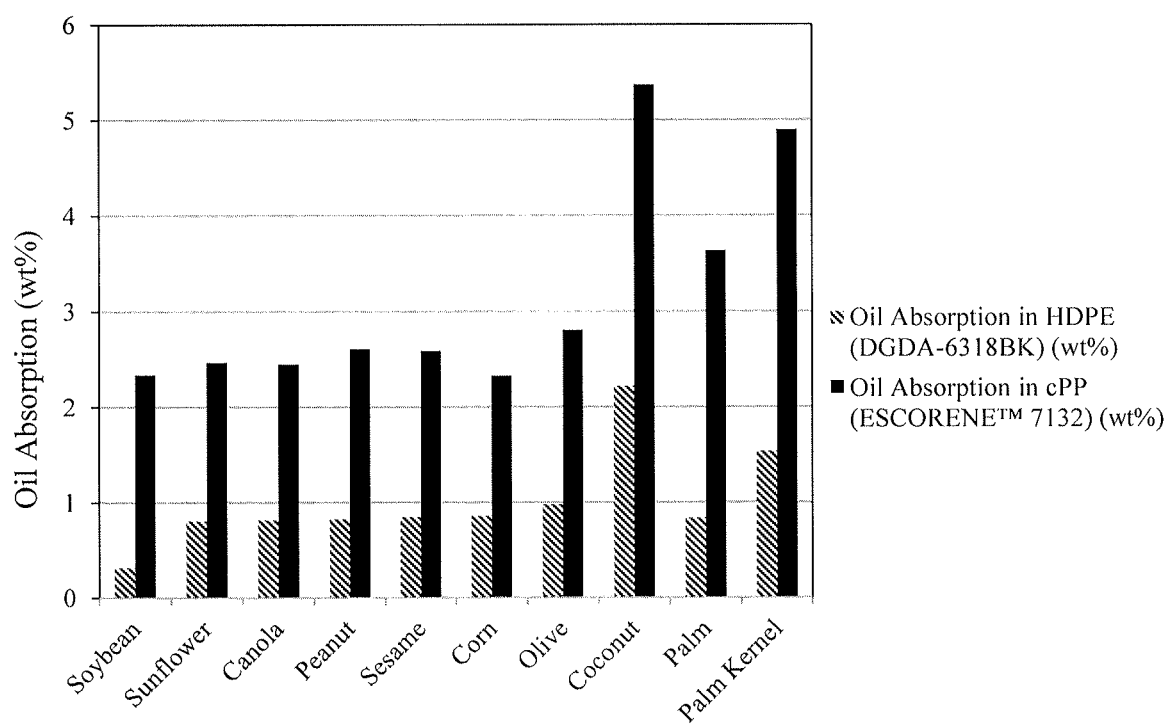
FIG. 2 is a chart reporting oil absorption in weight percent by HDPE and cPP.

The data in Table 3 show some vegetable oils have surprisingly low pickup in both high density polyethylene (HDPE) (DGDA-6318BK available from The Dow Chemical Company, having a density of 0.954 g/cm³) (a jacket compound) as well as polypropylene copolymer (cPP) (ES-CORENE™ 7132, an impact copolymer available from Exxon Chemical Company) (a buffer tube material). Compared to paraffinic oil, the pickup is nearly 30 times lower in HDPE and about 9 times lower in cPP. Vegetable oil also has better compatibility (lower pickup) compared to the higher cost PAO (DURASYN™ 126) which is of equivalent viscosity. The data also show slightly better compatibility versus PIB Indopol™ H-100, despite the fact that the latter has a higher viscosity. However, it was found that vegetable oils do not have similar absorption characteristics in polymers. For example, coconut, palm kernel and to a certain extent palm oils have larger absorption in the respective resins tested compared to other bio-based oils, as shown in Table 3 and FIG. 2. FIG. 2 is a chart reporting oil absorption in weight percent by HDPE and cPP.

Figure 3:
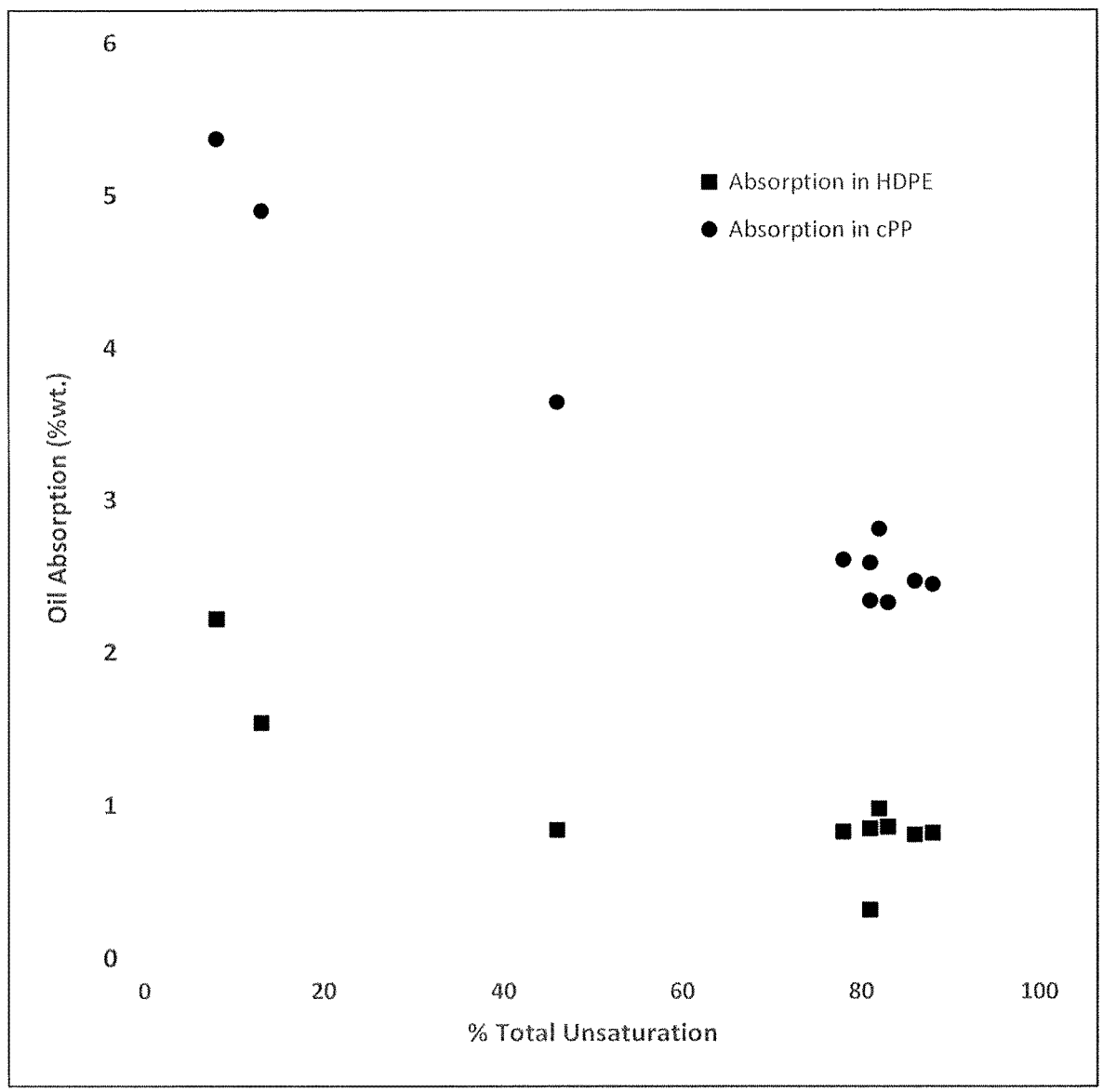
FIG. 3 is a chart reporting oil absorption in weight percent by HDPE and cPP versus the total unsaturation percent of the oil.

As shown by Table 3 and FIG. 3, oil absorption in the polymer resins is linked to total unsaturation of the individual oils. Lower unsaturation leads to high absorption in polymer resins, especially in cPP. Preferred oils typically have a total unsaturation level of greater than (>) 40%, or greater than 50%. FIG. 3 is a chart reporting oil absorption in weight percent by HDPE and cPP versus the total unsaturation percent of the oil.

Table 5 reports the properties of the compositions based on olefin elastomers. The compositions are prepared using the following protocol: place all oils and the antioxidant

TABLE 3

Oil Pickup/Absorption of Various Oils in HDPE and cPP Resins

| Oil/Compound | Supplier | Oil Type | Total Unsaturated Fatty Acids (%)* | Oil Absorption in HDPE[4] (wt %) | Oil Absorption in cPP[5] (wt %) |
|---|---|---|---|---|---|
| INFO-GEL ™ LA 444 | Stewart Group | Thixotropic filling compound[1] | | 4.97 | 10.94 |
| Indopol ™ L-14 | Ineos | PIB | | 5.05 | 20.71 |
| Soybean | Wegmans Food Markets | Vegetable | 81 | 0.32 | 2.34 |
| Sunflower | Foodhold USA | Vegetable | 86 | 0.81 | 2.47 |
| Canola | Conagra Foods | Vegetable | 88 | 0.82 | 2.45 |
| Peanut | Foodhold USA | Vegetable | 78 | 0.83 | 2.61 |
| Sesame | Liberty Richter | Vegetable | 81 | 0.85 | 2.59 |
| Corn | Foodhold USA | Vegetable | 83 | 0.86 | 2.33 |
| Olive | Deleo USA | Vegetable | 82 | 0.98 | 2.81 |
| Coconut | Health Source International, Inc. | Vegetable | 8 | 2.22 | 5.37 |
| Palm | Essential Wholesale and Labs | Vegetable | 46 | 0.84 | 3.64 |
| Palm Kernel | Essential Wholesale and Labs | Vegetable | 13 | 1.54 | 4.90 |
| Algae | Formulator Sample Shop | Biomass | | 2.12 | 4.03 |
| SUNPAR ™ 110 | Sunoco | Paraffinic | | 9.5 | 21.02 |
| DURASYN ™ 126 | Ineos | PAO | | 3.33 | 7.65 |
| DURASYN ™ 180I | Ineos | PAO | | −0.31 | 0.99 |
| DURASYN ™ 180R | Ineos | PAO | | −0.14 | 1.23 |
| UCON ™ OSP 32 | Dow | PAG[2] | | 0.64 | 3.08 |
| UCON ™ OSP 680 | Dow | PAG[3] | | −0.89 | 0.09 |

*Total unsaturation data based on Table 1, above.
[1]INFO-GEL LA 444 is a thixotropic filling gel containing synthetic oil formulated with polymers, thixotropic agents, and additives.
[2]UCON ™ OSP 32 is a synthetic polyalkylene glycol (PAG) having a flash point of 216° C. and a kinematic viscosity of 32 mm$^2$/sec at 40° C. (measured in accordance with ASTM D445).
[3]UCON ™ OSP 680 is a synthetic polyalkylene glycol (PAG) having a flash point of 243° C. and a kinematic viscosity of 680 mm$^2$/sec at 40° C. (measured in accordance with ASTM D445).
[4]DGDA-6318BK, available from The Dow Chemical Company, having a density of 0.954 g/cm$^3$.
[5]ESCORENE ™ 7132, an impact copolymer available from Exxon Chemical Company.

Table 4 reports the properties of the polyolefin elastomers used in the compositions reported in Table 5.

(IRGANOX™ 1035, [3-(3,5-di-tert-butyl-4-hydroxyphenyl)propionate]available from BASF) into a steel paint can

TABLE 4

Polyolefin Elastomer Properties

| Component | Specification/Properties | | Source |
|---|---|---|---|
| propylene/ethylene copolymer (P/E 1) | % crystallization = 32 wt % Brookfield Viscosity = 1,000 cP (@176.6° C.) $M_n$ = 12,796 $C_2$ wt % = 5.1 wt % | density = 0.884 g/cc $T_c$ = 72° C. $T_m$ = 106° C. | Internal Stock |
| propylene/ethylene copolymer (P/E 2) | % crystallization = 11 wt % Brookfield Viscosity = 4,000 cP (@176.6° C.) $M_n$ = 34,880 $C_2$ wt % = 13.1 wt % | density = 0.8639 g/cc $T_c$ = 30° C. $T_m$ = 64.6° C. | Internal Stock |
| AFFINITY ™ GA 1875 | ethylene/1-octene polyolefin plastomer crystallization = 21.7 wt % Brookfield Viscosity = 6,700 cP (@176.6° C.) $M_n$ = 7,210 $C_2$ wt % = 63.7 wt % | density = 0.870 g/cc $T_c$ = 57° C. $T_m$ = 70° C. | The Dow Chemical Company |
| ENGAGE ™ 8130 | ethylene/1-octene polyolefin elastomer % crystallization = 15.8 wt % $M_n$ = 52,400 $C_2$ wt % = 61 wt % | density = 0.864 g/cc $T_c$ = 38° C. $T_m$ = 56° C. | The Dow Chemical Company |
| EASTOFLEX ™ P1010 | amorphous propylene homopolymer (hPP) Brookfield Viscosity = 1,000 cP (@190° C.) | $T_m$ = 152.1° C. | Eastman | and place can on a hot plate. Begin stirring at 15 rpm using a steel paddle stirrer and lab stirrer such as Cole Parmer Digital Reversing Mixer EW-50004-00 and heat to about 100° C. Add the resins and continue stirring and heat to about 130-150° C. until all resins are melted. Maintain the temperature at 130-150° C. and mix at 25 rpm for 15 minutes after resins are melted. Take a sample out for Brookfield viscosity testing at 150° C.

The inventive examples IE1 through IE14 show the possibility of formulating with select vegetable oils having a total unsaturation of greater than 40% (soybean and canola oils, for example; and other possibilities of blending these oils with PAO oil, as shown by Examples IE11 through IE14), to achieve desirably low compound viscosity (in some cases, much lower than the target apparent viscosity of less than (<) 1,000 cP, or less than 400 cP, or less than 300 cP at 150° C.), thus the potential opportunity for additional fillers for low cost or other property improvements. Also the inventive compositions exhibit a soft solid to paste-like consistency and depending on the composition exhibits a low to no oil separation at room temperature and adequate drop point.

It is specifically intended that the present disclosure not be limited to the embodiments and illustrations contained herein, but include modified forms of those embodiments including portions of the embodiments and combinations of elements of different embodiments as come within the scope of the following claims.

TABLE 7

Properties of Comparative and Inventive Compositions

|  | CS1 | CS2 | CS3 | CS4 | CS5 | CS6 | CS7 | CS8 | CS9 | CS 10 | IE1 | IE2 | IE3 |
|---|---|---|---|---|---|---|---|---|---|---|---|---|---|
| AFFINITY ™ GA 1875 | 29.8 | 29.8 | 32.8 | 34.8 | 39.8 | 24 | 20 | 22.5 | — | — | 15 | — | — |
| EASTOFLEX ™ P1010 | — | — | — | — | — | — | — | 7.3 | — | — | 15.8 | 29.8 | 12.8 |
| P/E 1 | — | — | — | — | — | — | — | — | 15 | — | — | — | 12.8 |
| P/E 2 | — | — | — | — | — | — | — | — | 14.8 | — | — | — | — |
| ENGAGE ™ 8130 | — | — | — | — | — | — | — | — | — | — | — | — | — |
| Canola Oil (Vegetable) | — | — | — | — | — | — | — | — | — | — | — | — | — |
| Soybean Oil (Vegetable) | 70 | — | — | 65 | 55 | 71.8 | 73.8 | 70 | — | — | 69 | 70 | 74.2 |
| SUNPAR ™ 110 (Paraffinic) | — | — | 67 | — | — | — | — | — | 35 | — | — | — | — |
| DURASYN ™ 126 (PAO) | — | — | — | — | — | — | — | — | 35 | — | — | — | — |
| DURASYN ™ 180R (PAO) | — | 70 | — | — | — | — | — | — | — | — | — | — | — |
| AEROSIL ™ 200/202[1] | — | — | — | — | — | 4 | 6 | — | — | — | — | — | — |
| IRGANOX ™ 1035 | 0.2 | 0.2 | 0.2 | 0.2 | 0.2 | 0.2 | 0.2 | 0.2 | 0.2 | — | 0.2 | 0.2 | 0.2 |
| SONNEBORN ™ 683[2] | — | — | — | — | — | — | — | — | — | 100 | — | — | — |
| Total (wt %) | 100 | 100 | 100 | 100 | 100 | 100 | 100 | 100 | 100 | 100 | 100 | 100 | 100 |
| Visc.[3] @ 150° C. (cP) | 155 | 95 | 117 | 206 | 875 | 812 | >1000 | N/A | 58 | 307 | 250 | 280 | 105 |
| Consistency[4] @ 21° C. | P | P | S | P | W/H | P | P | P | P | P | P | P | P |
| Oil Separation 24 hrs @ 21° C.[5] | Y | N | N | Y | Y | Y | N | S | N | N | N | VS | N |
| Drop Pt ®65° C.[6] | | | 60.4 | | | | | | | >65 | | | |
| Drop Pt@80° C.[6] | <80 | <80 | | <80 | <80 | <80 | <80 | <80 | >80 | >80 | >80 | >80 | >80 |
| Drop Pt@90° C.[6] | | | | | | | | | | 102.8 | >90 | >90 | >90 |
| Drop Pt@100° C.[6] | | | | | | | | | | | >100 | >100 | >100 |
| Drop Pt@110° C.[6] | | | | | | | | | | | >110 | <110 | >110 |

|  | IE4 | IE5 | IE6 | IE7 | IE8 | IE9 | IE 10 | IE 11 | IE 12 | IE 13 | IE 14 |
|---|---|---|---|---|---|---|---|---|---|---|---|
| AFFINITY ™ GA 1875 | — | — | — | — | — | — | — | 10 | 10 | 10 | 10 |
| EASTOFLEX ™ P1010 | 14.8 | — | — | — | — | — | — | 19.8 | 19.8 | 19.8 | 19.8 |
| P/E 1 | 15 | 15 | 20 | 15 | 15 | 20 | 15 | — | — | — | — |
| P/E 2 | — | 14.8 | 19.8 | 9.8 | 14.8 | 19.8 | 9.8 | — | — | — | — |
| ENGAGE ™ 8130 | — | — | — | — | — | — | — | — | — | — | — |
| Canola Oil (Vegetable) | — | — | — | — | 70 | 60 | 75 | — | — | — | — |
| Soybean Oil (Vegetable) | 70 | 70 | 60 | 75 | — | — | — | 52.5 | 35 | 17.5 | 10 |
| SUNPAR ™ 110 (Paraffinic) | — | — | — | — | — | — | — | — | — | — | — |
| DURASYN ™ 126 (PAO) | — | — | — | — | — | — | — | 17.5 | 35 | 52.5 | 60 |
| DURASYN ™ 180R (PAO) | — | — | — | — | — | — | — | — | — | — | — |
| AEROSIL ™ 200/202[1] | — | — | — | — | — | — | — | — | — | — | — |
| IRGANOX ™ 1035 | 0.2 | 0.2 | 0.2 | 0.2 | 0.2 | 0.2 | 0.2 | 0.2 | 0.2 | 0.2 | 0.2 |
| SONNEBORN ™ 683[2] | — | — | — | — | — | — | — | — | — | — | — |
| Total (wt %) | 100 | 100 | 100 | 100 | 100 | 100 | 100 | 100 | 100 | 100 | 100 |
| Visc.[3] @ 150° C. (cP) | 185 | 78 | 195 | 50 | 95 | 198 | 53 | 119.5 | 71.2 | 67 | 60.5 |
| Consistency[4] @ 21° C. | P | P | W | P | P | P | P | P | P | P | P |
| Oil Separation 24 hrs @ 21° C.[5] | N | N | N | N | N | S | N | N | N | N | N |
| Drop Pt ®65° C.[6] | >80 | >65 | | | | | | | | | |
| Drop Pt@80° C.[6] | >90 | >80 | >80 | >80 | >80 | >80 | >80 | >80 | >80 | >80 | >80 |
| Drop Pt@90° C.[6] | | >90 | >90 | >90 | >90 | >90 | >90 | >90 | >90 | >90 | >90 |

TABLE 7-continued

Properties of Comparative and Inventive Compositions

| | | | | | | | | | | |
|---|---|---|---|---|---|---|---|---|---|---|
| Drop Pt@100° C.[6] | >100 | >100 | F | >100 | >100 | >100 | >100 | >100 | >100 | >100 |
| Drop Pt@110° C.[6] | >100 | >110 | | <110 | <110 | <110 | >110 | >110 | >110 | >110 |

CS = Comparative Sample
[1]AEROSIL ™ 200/202 is hydrophilic fumed silica thixotropic agent.
[2]SONNEBORN ™ Flooding Compound 683 is a comparative telecommunication cable flooding compound.
[3]Apparent viscosity of the composition is measured in accordance with ASTM D3236 at 150° C. (1 cps = 1 cP).
[4]Consisency of the composition is visually determined while the composition is at 21° C. P = Paste. S = Solid. W = Waxy. H = Hard.
[5]Oil separation is measured after aging for 24 hours at 21° C. according to ASTM D1742. Y = Yes. S = Slight. VS = Very Slight. N = None.
[6]Drop Point (° C.) is measured in accordance ASTM D127.

What is claimed is:

1. A cable comprising:
   (A) at least one wire; and
   (B) a flooding composition comprising in weight percent (wt %) based on the weight of the composition:
      (1) from 10 wt % to 30 wt % of a first component comprising a polyolefin elastomer consisting of only α-olefin residues and having a melting point of at least 50° C.; and
      (2) a second component consisting of
         (i) from 70 wt % to 90 wt % vegetable oil, or
         (ii) 70 wt % of a blend of vegetable oil and a polyalpha-olefin oil (PAO oil) consisting only of one or more alpha-olefins, the PAO oil is a liquid at 22° C.; and
      (3) 0.01-1 wt % optional additive;
   the flooding composition having a drop point of at least 90° C. as determined according to ASTM D127.

2. The cable of claim 1 in which the bio-based fluid component of the flooding composition has a total unsaturation level of greater than 40%.

3. The cable of claim 1 in which the bio-based fluid component of the flooding composition is free of any petroleum-based oil.

4. The cable of claim 1 in which the polyolefin elastomer component of the flooding composition has an Mn of greater than 5,000 g/mol; a weight-average molecular weight ("Mw") in the range of from 5,000 to 50,000 g/mol, and a polydispersity index ("Mw/Mn") in the range of from 1 to 5.

5. The cable of claim 1 in which the polyolefin elastomer component of the flooding composition has a density of less than 0.910 g/cm³ and a melting point of at least 55° C.

6. The cable of claim 1 in which the polyolefin elastomer component of the flooding composition is selected from the group consisting of an ethylene-based polyolefin elastomer, a propylene-based polyolefin elastomer, and combinations thereof.

7. The cable of claim 1 comprising:
   (a) at least one optical fiber;
   (b) a plurality of buffer tubes; and
   (c) the flooding composition.

8. The cable of claim 1 in which the flooding composition further comprises one or more additives selected from the group consisting of antioxidants, rheology modifiers, mineral fillers, polymer fillers, and stabilizers.

9. The cable of claim 1 in the form of a telecommunications cable.

10. The cable of claim 1 in the form of an optical fiber cable.

11. A cable comprising:
    (A) at least one wire; and
    (B) a flooding composition consisting of in weight percent (wt %) based on the weight of the composition:
       (1) 10-80 wt % of a first component that is one or more polyolefin elastomers, each polyolefin elastomer consisting of only α-olefin residues and having a melting point of at least 50° C.; and
       (2) 20-90 wt % of a second component consisting of
          (i) one or more vegetable oils, and
          (ii) optionally, a polyalpha-olefin oil (PAO oil) consisting only of one or more alpha-olefins, the PAO oil is a liquid at 22° C.; and
       (3) 0.01-1 wt % optional additive; and
    the flooding composition has a drop point of at least 90° C. as determined according to ASTM D127.

12. The cable of claim 1 wherein the additive is present in the flooding composition and the additive is an antioxidant.

13. The cable of claim 12 wherein the second component consists of from 70 wt % to 90 wt % vegetable oil.

14. The cable of claim 11 wherein the additive is present in the flooding composition and the additive is an antioxidant.

15. The cable of claim 14 wherein the polya-olefin is present in the flooding composition.

* * * * *